United States Patent [19]

Cella

[11] 4,116,886

[45] Sep. 26, 1978

[54] MOISTURE CURABLE EPOXY COMPOSITIONS CONTAINING DICARBONYL CHELATES

[75] Inventor: James A. Cella, Clifton Park, N.Y.

[73] Assignee: General Electric Company, Schenectady, N.Y.

[21] Appl. No.: 798,783

[22] Filed: May 20, 1977

[51] Int. Cl.² .............................................. C08L 63/00
[52] U.S. Cl. .............................. 528/88; 260/448.8 R; 528/89; 528/91; 528/92; 528/16; 528/24; 528/27; 528/29; 260/830 P; 260/824 EP
[58] Field of Search ......... 260/2 EC, 47 EC, 448.8 R

[56] References Cited

U.S. PATENT DOCUMENTS

| | | | |
|---|---|---|---|
| 3,200,136 | 7/1963 | Grossmith | 260/448.8 |
| 3,355,477 | 11/1967 | Frye | 260/448.8 A |
| 3,445,426 | 6/1967 | Lee | 260/448.8 R |
| 3,455,980 | 7/1969 | Frye | 260/448.8 R |
| 3,518,292 | 6/1970 | Frye | 260/448.8 R |
| 3,576,025 | 4/1971 | Frye | 260/448.8 R |
| 3,624,032 | 11/1971 | Miyashiro | 260/47 EC |
| 3,624,121 | 11/1971 | Selin | 260/448.8 R |
| 3,642,694 | 2/1972 | Selin | 260/46.5 |
| 3,720,634 | 3/1973 | Statton | 260/2 EC |
| 3,960,684 | 6/1976 | Feinberg | 260/2 EC |
| 3,998,763 | 12/1976 | Bohnel | 260/2 EC |

OTHER PUBLICATIONS

Pike, *Coordination Chemistry Reviews* 2, 1967, pp. 163–172.
Riley et al., *Inorganic Synethesis* 7, 1963, pp. 30–34.
West, *J. Am. Chem. Soc.* 80, 1958, pp. 3246–3249.
Muetterties et al, *J. Am. Chem. Soc.* 86, 1964, pp. 5132–5137.
West, *J. Org. Chem.* 23, 1958, pp. 1552–1553.
Muetterties et al., *J. Am. Chem. Soc.* 87, 1965, pp. 21–24.
Dilthey, *Justus Liebigs Annalen* 344, 1906, pp. 300–342.
Chemical and Engineering News, Apr. 28, 1958; p. 49.

*Primary Examiner*—M. J. Welsh
*Attorney, Agent, or Firm*—William A. Teoli; Joseph T. Cohen; Charles T. Watts

[57] ABSTRACT

Cationic polymerization of epoxy monomers, or prepolymers can be achieved by use of certain moisture sensitive dicarbonyl chelates of main row elements of Group IIIA–VA. Curable Compositions are provided which can be used as sealants, coating compounds, glues, incapsulants, etc.

16 Claims, No Drawings

MOISTURE CURABLE EPOXY COMPOSITIONS CONTAINING DICARBONYL CHELATES

The present invention relates to epoxy resin compositions which can be cured by exposure to atmospheric moisture, based on the employment of a dicarbonyl chelate of a main row element of Groups IIIA–VA.

Epoxy resins have generally been employed in a variety of applications requiring high performance materials. Cure of an epoxy resin can generally be achieved by two package systems based on the incorporation into the resin of an active amine containing compound or carboxylic acid anhydride. These systems require thorough mixing of the ingredients; in addition, cure time can be several hours.

Another catalyst which can be used to cure epoxy resins as "one package" systems is based on the employment of a Lewis Acid catalyst in the form of an amine complex such as boron trifluoride-monoethyl amine. The Lewis Acid is released on heating; cure takes place within 1 to 8 hours and can require a temperature of 160° C. and higher. As a result, these one package epoxy compositions cannot be employed to coat heat sensitive devices such as delicate electronic components. Nor can epoxy monomers having low boiling points be used due to the resulting losses to evaporation during cure.

As shown by Schlesinger, U.S. Pat. No. 3,703,296, certain photosensitive aromatic diazonium salts can be employed to cure epoxy resins. When photolyzed, these aromatic diazonium salts are capable of releasing, in situ, a Lewis Acid catalyst which can initiate the rapid polymerization of the epoxy resin. However, even though these one package epoxy resin mixtures can provide fast curing compositions, a stabilizer must be used to minimize cure in the dark during storage of these mixtures. Despite these measures, gelation of the mixture can occur even in the absence of light. In addition, nitrogen is released during UV-cure, which can result in film imperfections. Diazonium salts are generally thermally unstable, rendering the use of such materials hazardous because of the possibility of run-away decomposition.

In copending applications of James V. Crivello, Ser. Nos. 638,982, 638,983 and 638,994, filed Dec. 9, 1975 and assigned to the same assigneee as the present invention, various photodecomposable onium salts are defined which are useful for curing epoxy resins upon exposure to ultraviolet light. In my copending application Ser. No. 798,784, filed concurrently herewith on May 20, 1977, now U.S. Pat. No. 4,086,091 and assigned to the same assignee as the present invention, there is disclosed that certain dicarbonyl chelates of main row elements of Groups IIIA, IVA and VA of the formula,

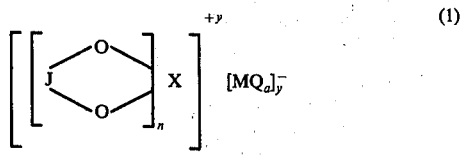

can be used in epoxy resins to produce additional U.V. curable compositions, where X is a main row element selected from Group IIIA, IVA and VA, J is a divalent organo radical having 3 to 42 carbon atoms, M is an element selected from Sb, As, P, B and Cl, Q is selected from O and F, $n$ is an integer equal to 2 or 3, $y$ is an integer equal to 1 or 2, and $a$ is an integer equal to 4 to 6 or the valence of M.

The present invention is based on the discovery that blends of epoxy resin and an effective amount of the dicarbonyl chelates can also be used under ambient conditions as sealants, coating compounds and incapsulants.

Radicals included by J of formula (1) are, for example,

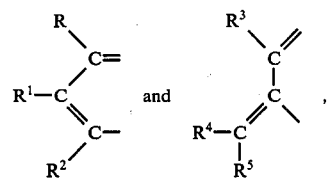

where R and $R^2$ are selected from hydrogen, amino, saturated $C_{(1-8)}$ aliphatic hydrocarbon, saturated $C_{(1-8)}$ cycloaliphatic hydrocarbon, unsaturated $C_{(1-8)}$ aliphatic hydrocarbon, unsaturated $C_{(1-8)}$ cycloaliphatic, $C_{(6-13)}$ aromatic, substituted $C_{(6-13)}$ aromatic, $C_{(1-8)}$ alkoxy, and halogenated derivatives thereof, etc.; $R^1$ is selected from halogen, R and $R^2$; R, $R^1$ and $R^2$ also can be part of the same cycloaliphatic radical; $R^3$ is selected from hydrogen, amino, $C_{(1-8)}$ aliphatic, $C_{(1-8)}$ cycloaliphatic, $C_{(6-13)}$ aromatic, $C_{(1-8)}$ alkoxy and substituted derivatives thereof, etc.; $R^4$ and $R^5$ are selected from halogen, $R^2$ and $R^3$; $R^3$ and $R^5$, and $R^3$, $R^4$ and $R^5$ can be part of a cycloaliphatic or aromatic ring, respectively.

Included in the carbonyl chelates of formula (1) are chelates, such as

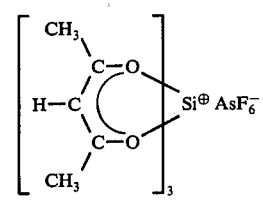

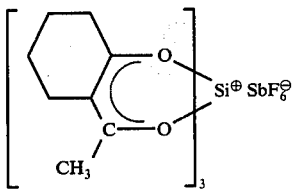

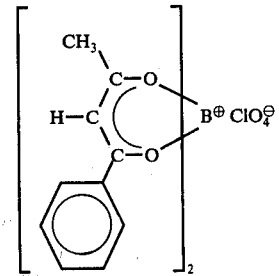

-continued

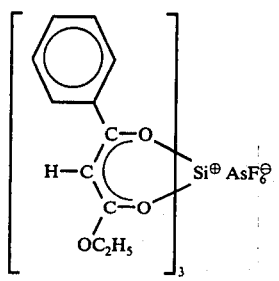

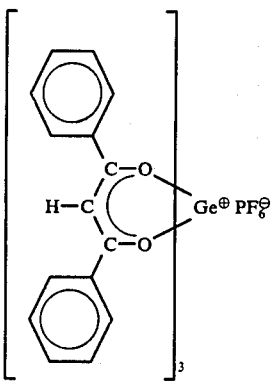

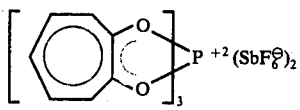

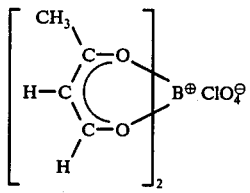

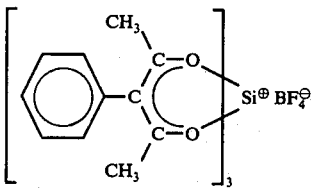

There is provided by the present invention, moisture curable epoxy compositions comprising, (A) an epoxy resin polymerizable to a high molecular weight state selected from epoxy monomer, epoxy prepolymer, oxirane containing organic polymer and mixtures thereof and (B) an effective amount of a moisture sensitive dicarbonyl chelate of formula (1).

The dicarbonyl chelates of formula (1) can be prepared by a metathetical reaction between an alkali metal salt of an $MQ_a$ acid with the halide salt of a chelate prepared by the direct reaction of a dicarbonyl ligand with a halide of an appropriate X in the presence of an organic solvent under anhydrous conditions by procedures shown by R. West, J. Amer. Chem. Soc., 80, 3246 (1958), E. L. Muetterties and A. N. Wright, J. Amer. Chem. Soc., 86, 5132 (1964), R. Riley, R. West and R. Barbarian, Inorg. Syn., 1, 30 (1963), W. Dilthey, Ann. 344, 300 (1906) and R. West, J. Org. Chem., 23, 1552 (1958).

The term "epoxy resin" as utilized in the description of the curable compositions of the present invention, includes any monomeric, dimeric or oligomeric or polymeric epoxy material containing one or a plurality of epoxy functional groups. For example, those resins which result from the reaction of bisphenol-A (4,4'-isopropylidenediphenol) and epichlorohydrin, or by the reaction of low molecular weight phenol-formaldehyde resins (Novolak resins) with epichlorohydrin, can be used alone or in combination with an epoxy containing compound as a reactive diluent. Such diluents as phenyl glycidyl ether, 4-vinylcyclohexene dioxide, limonene dioxide, 1,2-cyclohexene oxide, glycidyl acrylate, glycidyl methacrylate, styrene oxide, allyl glycidyl ether, etc., may be added as viscosity modifying agents.

In addition, the range of these compounds can be extended to include polymeric materials containing terminal or pendant epoxy groups. Examples of these compounds are vinyl copolymers containing glycidyl acrylate or methacrylate as one of the comonomers. Other classes of epoxy containing polymers amenable to cure using the above catalysts are epoxysiloxane resins, epoxy-polyurethanes and epoxy-polyesters. Such polymers usually have epoxy functional groups at the ends of their chains. Epoxy-siloxane resins and method for making are more particularly shown by E. P. Plueddemann and G. Fanger, J. Am. Chem. Soc. 81 632-5 (1959). As described in the literature, epoxy resins can also be modified in a number of standard ways such as reactions with amines, carboxylic acids, thiols, phenols, alcohols, etc., as shown in U.S. Pat. Nos. 2,935,488; 3,235,620; 3,369,055; 3,379,653; 3,398,211; 3,403,199; 3,563,850; 3,567,797; 3,677,995, etc. Further examples of epoxy resins which can be used are shown in the Encyclopedia of Polymer Science and Technology, Vol. 6, 1967, Interscience Publishers, New York, pp 209-271.

The curable compositions of the present invention can be made by blending the epoxy resin as previously defined with an effective amount of the dicarbonyl chelate. The resulting curable composition can be in the form of a varnish having a viscosity of from 1 centipoise to 100,000 centipoises at 25° C. or a free flowing powder.

Depending upon the compatibility of the dicarbonyl chelate with the epoxy resin, the chelate can be dissolved or dispersed therein along with an organic solvent such as nitromethane, acetonitrile, etc., prior to its incorporation. In instances where the epoxy resin is a solid, incorporation of the chelate can be achieved by dry milling or by melt mixing the resin whereby the chelate is incorporated.

Experience has shown that the proportion of dicarbonyl chelate to epoxy resin can vary widely inasmuch as the chelate is substantially inert, unless activated with moisture. Effective results can be achieved if a proportion of from 0.1 to 15% by weight of the chelate is employed, based on the weight of curable composition.

The curable compositions also may contain inactive ingredients such as inorganic fillers, dyes, pigments, extenders, viscosity control agents, process aids, UV-screens, etc., in amounts of up to 100 parts of filler per 100 parts of epoxy resin. The curable compositions can be applied to such substrates as metal, rubber, plastic, molded parts or films, paper, wood, glass cloth, concrete, ceramic, etc.

Some of the applications in which the curable compositions of the present invention can be used are, for example, protective, decorative and insulating coatings, potting compounds, printing inks, sealants, adhesives, photoresists, wire insulation, textile coatings, laminates, impregnated tapes, printing plates, etc.

In order that those skilled in the art will be better able to practice the invention, the following examples are given by way of illustration and not by way of limitation. All parts are by weight.

EXAMPLE 1

A solution of 18 ml of acetyl acetone and 20.5 ml of silicone tetrachloride in 80 ml of dry benzene was refluxed for 1 hour. The cooled mixture was filtered and the collected product was dried 15 hours in a vacuum desiccator. The dried material had a melting point of 174°–176° centrigrade and weighed 20.6 grams. Based on method of preparation and $^{29}$Si NMR spectra, the product was tris-acetyl acetonato silicon(IV) chloride hydrochloride.

A solution of 1 gram of the above tris-acetyl acetonato silicon(IV) chloride hydrochloride in 5 ml of methylene chloride was mixed with 0.5 grams of sodium hexafluorophosphate and 5 ml of a mixture of methylene chloride and acetone. The mixture was heated on a steam bath until evolution of hydrogen chloride was completed. The cooled solution was diluted with ether and the precipitate product was collected by filtration. There was obtained 1.0 gram of solids which were redissolved in methylene chloride, filtered and reprecipitated with ether. There was obtained 0.6 gram of the corresponding hexafluorophosphate chelate having a melting point of 136°–140° C. and the formula,

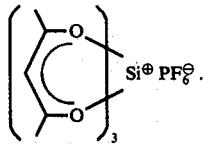

The identity of the salt was further confirmed by its infrared, H-NMR and $^{29}$Si NMR Spectra.

A curable composition was prepared by dissolving 0.1 gram of the above hexafluorophosphate silicon chelate into 5 grams of epoxy resin of the formula,

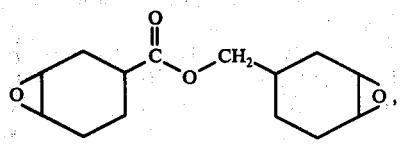

along with enough acetone to make a homogeneous solution. The curable composition was then applied onto a glass substrate to a thickness of about 10 mil. The treated glass substrate was then exposed to steam at a temperature of about 95° C. A tack-free film was obtained in less than 2 minutes.

EXAMPLE 2

In accordance with the procedure of Example 1, 2% solutions of several additional chelates and the epoxy resin of Example 1, were prepared. For example, tris-acetylacetonato silicon (IV) hexafluoroantimonate was prepared by effecting reaction between 1 part of tris-acetylacetonato silicon (IV) hydrochloride with 0.8 part of sodium hexafluoroantimonate in about 5 parts of acetone. Sodium chloride was removed by filtration, followed by treatment of the filtrate with dry ether to produce 0.6 part of tris-acetylacetonato silicon (IV) hexafluoroantimonate. The various moisture curable epoxy resin compositions were exposed to steam at 95° C. under sealed conditions. The following results were obtained where "chelate salt" indicates the particular tris-acetylacetonato silicon (IV) chelate salt employed in the mixture and "cure time" indicates the period of exposure to steam at 95° C. in minutes;

| Chelate Salt | Cure Time (Min.) |
|---|---|
| $PF_6$ | 2 |
| $SbF_6$ | 1 |
| $AsF_6$ | 1.5 |
| $BF_4$ | Slight tackiness after 15 min. |

In addition to the above shown chelate salts utilized in the practice of the invention, a 2% solution of tris-acetylacetonato silicon (IV) $HCl_2$ was also evaluated. It was found that the resulting epoxy mixture did not cure after 15 minutes exposure to steam.

EXAMPLE 3

Reaction was effected between 2 grams of acetylacetone and 5 ml of methylene chloride with 10 ml of a 0.2 molar solution of boron trichloride. When gas evolution ceased, the solution was diluted with 50 ml of ether and the chloride salt was isolated. The corresponding boronium hexafluoroantimonate salt was prepared by mixing the aforementioned methylene chloride salt solution with 1.5 grams of sodium hexafluoroantimonate dissolved in acetone. The sodium chloride which was formed was removed by filtration and the desired dicarbonyl boronium hexafluoroantimonate salt was isolated by dilution of the filtrate with ether, followed by filtration.

A curable composition was prepared by dissolving 3.2 grams of the above chelate and 10 grams of the epoxy resin of Example 1. A 25 mil film of the resulting composition was exposed to air at a 50% relative humidity. A tack free gel was formed after 1 hour of exposure and a solid cured film was obtained after 6 hours of exposure.

EXAMPLE 4

A solution of 9.8 grams of dibenzoyl methane and 5.1 ml of silicon tetrachloride and 40 ml of dry benzene was refluxed for 30 minutes. The precipitated salt was collected by filtration. A solution of 1.5 grams of the crude salt in chloroform and equal volumes of chloroform and acetone was mixed with 0.5 grams of sodium hexafluoroantimonate in acetone. After removal of sodium chloride by filtration and precipitation of the resulting chelate from the filtrate with ether there was obtained 1.3 grams of tris-dibenzoyl methanato silicon (IV) hexafluoroantimonate as yellow prisms. Its melting point was 270°–271.5° C.

A curable composition was prepared by dissolving 0.1 grams of the above chelate and 2 ml of acetone and then adding 5 grams of the the epoxy resin of Example 1. Exposure of the resulting composition to steam for 2.5 minutes produced a solid brittle mass. In the absence of moisture, the solution remained fluid for at least 2 months at ambient temperature.

EXAMPLE 5

A tris-tropolonate dichloride chelate of phosphorus was prepared by mixing a solution of 8.4 grams of phosphorus pentachloride in methylene chloride with a solution of 1.5 grams of tropolone in methylene chloride. There was reacted 0.5 grams of the aforementioned chelate with two equivalents of sodium hexafluoroantimonate to yield the corresponding bishexafluoroantimonate chelate.

A curable composition was prepared from 0.05 part of the above chelate and 5 parts of the epoxy resin of Example 1. along with sufficient acetone to produce a homogeneous solution. Exposure of the solution to a 75% RH atmosphere produced a hard gel after about 3-4 hours.

EXAMPLE 6-16

Additional dicarbonyl chelates were prepared following the procedure previously described. The dicarbonyl chelates were respectively mixed with the diepoxide of Example 1 to produce curable mixtures having about 1% by weight of the dicarbonyl chelate. The following table shows the dicarbonyl chelates which were prepared where "J," "X" and "MQa" are defined in formula (1):

| J | X | MQa |
|---|---|---|
| 1-phenyl-1,3-butenyl | Si | SbF$_6$ |
| 1-ethylcyclohex-1-en-2-yl | Si | SbF$_6$ |
| 1,2-cyclohepta-2,4,6-trienyl | Ge | SbF$_6$ |
| 1-ethyl-cyclopent-len-2-yl | Si | SbF$_6$ |
| 1,3-diphenylpropenyl | B | SbF$_6$ |
| 5-ethoxy-2,4-pent-2-enyl | Si | SbF$_6$ |
| 2,4-pent-2-enyl | Si | ClO$_4$ |
| 1,2-cyclohepta-2,4,6-trienyl | Si | SbF$_6$ |
| 1-ethylcyclopent-1-en-2-yl | Si | ClO$_4$ |
| 1,3-diphenylpropenyl | Ge | SbF$_6$ |
| 3-chloro-2,4-pent-2-enyl | Si | SbF$_6$ |

The above compositions were found to cure to a hard gel after being applied to a thickness of about 1 mil on a steel substrate and exposed to steam at atmospheric pressure for 10 minutes.

EXAMPLE 17

A polymerizable composition was prepared by dissolving 2 parts of tris-acetylacetonatosilicon (IV) hexafluoroantimonate in part dry chloroform and 100 parts of Epon 828, which is a diglycidylether of bisphenol-A. This mixture was applied to fiberglass tape wound around a copper conductor. When this tape-wrapped conductor was exposed to steam, the epoxy resin set to a hard coating after 10 minutes of exposure.

Although the above examples are directed to only a few of the very many variables included by the curable compositions of the present invention, it should be understood that the curable compositions include a much broader variety of dicarbonyl chelates of formula (1) and the epoxy resin compositions shown in the description preceding these examples.

What I claim as new and desire to secure by Letters Patent of the United States is:

1. A moisture curable epoxy composition comprising
(A) an epoxy resin polymerizable to the high molecular weight state selected from epoxy monomer, epoxy prepolymer, oxirane containing organic polymer and mixtures thereof, and
(B) an effective amount of a moisture sensitive dicarbonyl chelate of the formula,

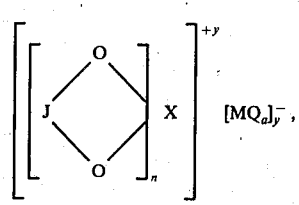

where X is a main row element selected from boron, silicon, phosphorus and germanium, J is a divalent organic radical having from 3 to 42 carbon atoms, M is an element selected from Sb, As, P, B and Cl, Q is fluorine or oxygen, $n$ is an integer equal to 2 or 3, $y$ is an integer equal to 1 or 2, and $a$ is an integer equal to 4 to 6 or the valence of M.

2. A curable composition in accordance with claim 1, where X of the dicarbonyl chelate is silicon.

3. A curable composition in accordance with claim 1, where X of the dicarbonyl chelate is boron.

4. A curable composition in accordance with claim 1, where X of the dicarbonyl chelate is phosphorous.

5. A curable composition in accoreance with claim 1, where X of the dicarbonyl chelate is germanium.

6. A curable composition in accordance with claim 1, where the dicarbonyl chelate is tris-acetyl acetonato silicon (IV) hexafluorophosphate.

7. A curable composition in accordance with claim 1, where the dicarbonyl chelate is tris-acetyl acetonato silicon (IV) hexafluoroantimonate.

8. A curable composition in accordance with claim 1, where the dicarbonyl chelate is tris-acetylacetonato silicon (IV) hexafluoroarsenate.

9. A curable composition in accordance with claim 1, where the dicarbonyl chelate is tris-acetylacetonato silicon (IV) tetrafluoroborate.

10. A curable composition in accordance with claim 1, where the dicarbonyl chelate is tris-acetylacetonato silicon (IV) perchlorate.

11. A curable composition in accordance with claim 1, where the dicarbonyl chelate is tris-tropolonato silicon (IV) hexafluoroantimonate.

12. A curable composition in accordance with claim 1, where the dicarbonyl chelate is tris-dibenzoylmethanato silicon (IV) hexafluoroantimonate.

13. A curable composition in accordance with claim 1, where the dicarbonyl chelate is tris-2-actylcyclohexanato silicon (IV) hexafluoroantimonate.

14. A curable composition in accordance with claim 1, where the dicarbonyl chelate is tris-2-acetylcyclopentanato silicon (IV) hexafluoroantimonate.

15. A curable composition in accordance with claim 1, where the dicarbonyl chelate is tris-ethylbenzoylacetato silicon (IV) hexafluoroantimonate.

16. A substrate coated with the cured composition of claim 1.

* * * * *